United States Patent [19]

Poth et al.

[11] Patent Number: 4,565,730

[45] Date of Patent: Jan. 21, 1986

[54] COATING COMPOSITION, IN PARTICULAR FOR PRODUCING A TRANSPARENT TOPCOAT OF A MULTILAYER COATING, A PROCESS FOR PRODUCING COATINGS, AND AN ARTICLE COATED WITH A MULTILAYER COATING

[75] Inventors: Ulrich Poth, Münster; Fritz Bartol, Hamm; Adolf Machholz, Würzburg, all of Fed. Rep. of Germany

[73] Assignee: BASF Farben & Fasern AG, Hamburg, Fed. Rep. of Germany

[21] Appl. No.: 620,755

[22] Filed: Jun. 14, 1984

[30] Foreign Application Priority Data

Jun. 18, 1983 [DE] Fed. Rep. of Germany ....... 3322037

[51] Int. Cl.[4] ............................ C08F 8/30; B05D 1/36
[52] U.S. Cl. ..................................... 428/204; 525/125; 427/407.1; 427/385.5
[58] Field of Search ...................... 525/125; 428/204; 427/407.1, 385.5

[56] References Cited

U.S. PATENT DOCUMENTS

| | | | |
|---|---|---|---|
| 3,249,463 | 5/1966 | Carlée | 524/522 |
| 3,773,710 | 11/1973 | Victorius | 525/125 |
| 4,315,053 | 2/1982 | Poth et al. | 428/458 |
| 4,391,858 | 7/1983 | Batzill | 427/409 |
| 4,413,084 | 11/1983 | Horvath | 525/125 |
| 4,415,697 | 11/1983 | Peng et al. | 525/125 |

Primary Examiner—John C. Bleutge
Assistant Examiner—A. L. Carrillo
Attorney, Agent, or Firm—Wells & Wells

[57] ABSTRACT

A coating composition, in particular for producing the transparent topcoat of a multilayer coating. The coating composition contains as binders two acrylic polymers, A and B, as well as aliphatic and/or cycloaliphatic polyisocyanates. Acrylic polymer A has a molecular weight of 800 to 4,000, a hydroxyl number of 80 to 180 and a glass transition temperature of below −10° C. Acrylic polymer B has a molecular weight of 3,000 to 10,000, a hydroxyl number of 40 to 120 and a glass transition temperature of −10° C. to +10° C. Whereas in acrylic polymer A the proportion of acrylic acid esters predominates, polymer B contains methacrylic acid esters as predominant monomer components.

12 Claims, No Drawings

COATING COMPOSITION, IN PARTICULAR FOR PRODUCING A TRANSPARENT TOPCOAT OF A MULTILAYER COATING, A PROCESS FOR PRODUCING COATINGS, AND AN ARTICLE COATED WITH A MULTILAYER COATING

BACKGROUND OF THE INVENTION

The invention relates to a coating composition which contains solvents and, as binders, hydroxyl-containing acrylic polymers and aliphatic and/or cycloaliphatic polyisocyanate, may also contain flow-control agents, UV absorbers and radical traps and is intended in particular for producing, by the wet-on-wet method, a transparent topcoat of a multilayer coating which comprises at least one pigment-containing base coat and at least one transparent topcoat.

Two-layer metallic finishes are frequently produced using the wet-on-wet method: in a first step a base coat containing metal pigments with or without additional coloring pigments is produced by applying a base lacquer. After a period of air-drying, a transparent coating composition, ie. generally a clear lacquer, is applied as topcoat to the not fully hardened base lacquer, and the two coats are then jointly baked, ie. hardened. Also known are air-drying systems, which harden at room temperature.

The topcoat is frequently produced by means of clear lacquers which contain as binders hydroxyl-containing acrylate resins combined with amino resins. When ready for application, ie. when having a German Industrial Standard DIN 4 cup efflux time of 24 to 30 seconds, these clear lacquers normally have a solids content of 35 to 45% by weight and hence a solvent content of 55 to 65% by weight.

Environmental and economic reasons were behind the development of high-solid clear lacquers which, when ready for application, have a solids content of 45 to 55% by weight. The higher solids content is obtained by lowering the molecular weight of the binders and by using soft and hence more soluble binder components. The high-solid clear lacquers used to date have the disadvantage of adversely affecting the arrangement of the metal pigments of the base coats and hence of producing an unsatisfactory metallic effect, and the coatings produced from them have, in particular if low baking temperatures are used, an unsatisfactory resistance to chemicals.

Use is also made of two-component clear lacquers which contain as binders hydroxyl-containing acrylate resins and to which have been added polyisocyanates. These lacquers, when ready for application, customarily have a solids content of 32 to 45% by weight. Their advantages lie in a low hardening temperature of 20° to 120° C. and a higher resistance to chemicals. If an attempt is made to raise the solids content of these lacquers by increasing the proportion of acrylate resins having a low molecular weight, this gives rise to the problem of redissolving.

SUMMARY OF THE INVENTION

It is an object of the invention to provide a clear lacquer which has a high solids content when ready for processing, gives rise to coatings having a high resistance to the weather and chemicals and at the same time leads to a good metallic effect on being deployed in the wet-on-wet method for producing a two-layer or multilayer metallic finish.

This object is surprisingly achieved by a coating composition which contains as binders a combination of two specific hydroxyl-containing acrylate resins and an aliphatic and/or cycloaliphatic polyisocyanate or a mixture of such polyisocyanates.

The invention accordingly provides a coating composition which is of the type mentioned at the outset and in which the binder comprises the following components:

(A) 50 to 90% by weight, based on total acrylic polymers, of a first acrylic polymer having
  a molecular weight of 800 to 4,000,
  a hydroxyl number of 80 to 180 and
  a glass transition temperature below $-10°$ C. and having been prepared from
  ($a_1$) 75 to 100% by weight of acrylic acid esters,
  ($a_2$) 0 to 25% by weight of methacrylic acid esters, a sufficient proportion of components $a_1$ and $a_2$ being hydroxyalkyl acrylates or hydroxyalkyl methacrylates that the hydroxyl number of 80 to 180 is reached,
  ($a_3$) 0 to 15% by weight of comonomers having aromatic groups and
  ($a_4$) 0 to 2% by weight of $\alpha,\beta$-ethylenically unsaturated acids, the proportions of components $a_1$ to $a_4$ adding up to 100%, (B) 10 to 50% by weight, based on total acrylic polymers, of a second acrylic polymer having
  a molecular weight of 3,000 to 10,000,
  a hydroxyl number of 40 to 120 and
  a glass transition temperature of $-10°$ C. to $+70°$ C. and having been prepared from
  ($b_1$) 0 to 30% by weight of acrylic acid esters,
  ($b_2$) 70 to 90% by weight of methacrylic acid esters, a sufficient proportion of components $b_1$ and $b_2$ being hydroxyalkyl acrylates or hydroxyalkyl methacrylates that the hydroxyl number of 40 to 120 is reached,
  ($b_3$) 0 to 30% by weight of comonomers having aromatic groups and
  ($b_4$) 0 to 30% by weight of $\alpha,\beta$-ethylenically unsaturated acids, the proportions of components $b_1$ to $b_4$ adding up to 100%, and (c) an aliphatic or cycloaliphatic polyisocyanate or a mixture of such polyisocyanates in such an amount that there are 0.8 to 1.3 isocyanate groups per hydroxyl group of components (A) and (B).

DESCRIPTION OF THE PREFERRED EMBODIMENTS

Polymer A is prepared by free-radical solution polymerization of monomers $a_1$ to $a_4$. Component $a_1$ can be the methyl, ethyl, n-propyl, i-propyl, n-butyl, i-butyl, sec.-butyl, t-butyl, n-pentyl, neopentyl, n-hexyl, cyclohexyl, n-octyl, 2-ethylhexyl, N-dodecyl (lauryl), 2-hydroxyethyl, 4-hydroxybutyl or hydroxypropyl ester of acrylic acid. The corresponding esters of methacrylic acid are suitable for use as component $a_2$. Components $a_1$ and $a_2$ must be chosen in such a way that polymer A has a hydroxyl number of 80 to 180 and a glass transition temperature of below $-10°$ C. The glass transition temperature of the polymer can be calculated from the glass transition temperatures of the monomer components by means of the following formula $$\frac{1}{T_g} = \Sigma \frac{m_i}{T_{gi}}$$

where $T_g$ is the glass transition temperature of the polymer, and $T_{gi}$ and $m_i$ respectively are the glass transition temperatures and the weight proportions of the monomer components.

The monomers with aromatic groups may account for up to 15% by weight of the total amount of all comonomers. Examples of suitable monomers with aromatic groups are styrene, α-methylstyrene and vinyltoluene (component $a_3$).

Component $a_4$ can be acrylic acid and/or methacrylic acid in a proportion of up to 2% by weight. The polymerization is carried out in such a way that resulting polymer A has a molecular weight, as measured by gel permeation chromatography, of 800 to 4,000. This molecular weight can be obtained by suitable control of the process parameters such as temperature, quantity and nature of the initiator, concentration and time.

Components $b_1$ to $b_4$ for the preparation of polymer B can in principle be the same monomers as used as components $a_1$ to $a_4$ in the preparation of polymer A. However, they must be selected in such a way that the copolymer formed has a hydroxyl number of 40 to 120 and a glass transition temperature of $-10°$ C. to $+70°$ C., and the polymerization must be carried out in such a way that the product has a molecular weight of 3,000 to 10,000. Whereas in polymer A the proportion of acrylic acid esters predominates, polymer B predominantly contains methacrylic acid esters.

Component C is aliphatic or cycloaliphatic polyisocyanates, preferably compounds having 2 isocyanate groups per molecule. Examples thereof are hexamethylene diisocyanate, trimethylhexamethylene diisocyanate, 1-methyl-2,4-diisocyanatocyclohexane, 3-isocyanatomethyl-3,5,5-trimethylcyclohexyl diisocyanate and 4,4-dicyclohexylmethane diisocyanate, as well as oligomers or urethane oligomers obtained by isocyanurate or diurethane formation.

In addition to the binder components mentioned, the coating composition according to the invention contains organic solvents, for example xylene, toluene, other alkylbenzenes, ethyl acetate, butyl acetate, ethyl glycol acetate and/or ketones. The coating composition may also contain flow-control agents, for example silicone oils, UV absorbers and radical traps, for example sterically hindered tertiary amines, benzophenol derivatives and oxanilides.

The invention also relates to a process for producing coatings by applying at least one pigment-containing base coat on top of which is applied by the wet-on-wet method, after a period of air-drying, a coating composition which contains solvents and, as binders, hydroxyl-containing acrylic polymers and aliphatic and/or cycloaliphatic polyisocyanate, may also contain flow-control agents, UV absorbers and radical traps and forms a transparent topcoat, and the coats harden at room temperature or are hardened by conjoint heating, wherein the binder of the coating composition comprises the following components:

(A) 50 to 90% by weight, based on total acrylic polymers, of a first acrylic polymer having
  a molecular weight of 800 to 4,000,
  a hydroxyl number of 80 to 180 and
  a glass transition temperature below $-10°$ C. and having been prepared from
  ($a_1$) 75 to 100% by weight of acrylic acid esters,
  ($a_2$) 0 to 25% by weight of methacrylic acid esters, a sufficient proportion of components $a_1$ and $a_2$ being hydroxyalkyl acrylates or hydroxyalkyl methacrylates that the hydroxyl number of 80 to 180 is reached,
  ($a_3$) 0 to 15% by weight of comonomers having aromatic groups and
  ($a_4$) 0 to 2% by weight of α,β-ethylenically unsaturated acids, the proportions of components $a_1$ to $a_4$ adding up to 100%, as well as to an article coated with a multilayer coating and prepared by the process according to the invention.

The base coat can be formed from the state of the art coating compositions as described in, for example, U.S. Pat. No. 3,639,147.

Hereinafter the invention is illustrated in more detail by reference to examples.

EXAMPLE I

Base Lacquers

1. Polyester for baking base lacquer 2,2-Dimethylpropane-1,3-diol, hexane-1,6-diol, 1,1,1-trimethylolpropane, benzene-1,3-dicarboxylic acid and adipic acid are weighed in a molar ratio of 3:1:1:3:1 into a reaction vessel equipped with stirrer, thermometer, inert gas supply line, packed column, thermometer for checking the temperature at the top of the column, descending condenser and distillate receiver, followed by 3% of xylene and 92% (based on the total amount of the reaction mixture) of zinc octoate, and the mixture is heated with stirring under a slow inert gas stream to 180° C. The reaction mixture is reacted at 180° C., slowly rising to a maximum of 220° C., until an acid number of 14.5 has been reached, by distilling off the water of reaction while the temperature at the top of the column must not exceed 103° C. The mixture is then cooled down, and the resulting polyester resin is dissolved in a ratio 3:1 in a mixture of xylene and ethylene glycol monoethyl ester acetate in such a way that the resulting polyester solution has a solids content of 60%.

2. Acrylate for baking base lacquer

A mixture of 400 g of xylene, 500 g of butyl acetate and 100 g of n-butanol is weighed into a reaction vessel equipped with stirrer, thermometer, reflux condenser and add vessel, and is heated with stirring to the boil. A mixture of 500 g of methyl methacrylate, 330 g of n-butyl methacrylate, 150 g of 2-hydroxypropyl methacrylate, 20 g of methacrylic acid and 25 g of t-butyl perbenzoate is introduced into the add vessel, and is metered into the reaction vessel at a uniform rate in the course of 3 hours during which the temperature is controlled in such a way as to ensure mild reflux conditions throughout. This temperature is then maintained for a further 3 hours until complete conversion has led to a 50% strength polymer resin solution.

3. Acrylate resin for air-drying base lacquer

A mixture of 450 g of n-butyl acetate, 600 g of methyl methacrylate, 375 g of n-butyl methacrylate, 25 g of acrylic acid and 5 g of azoisobutyrodinitrile is weighed into a reaction vessel equipped with stirrer, thermometer and reflux condenser and is heated to 80° C. Careful heating is continued until the exothermic reaction starts, when cooling is employed instead. The temperature is then maintained at 90° C. for 30 minutes, a further 300 g of butyl acetate and 5 g of azoisobutyrodinitrile are then added, and the temperature is brought back again to 90° C. This operation is repeated a further two times. After the last addition the temperature is maintained at 90° C. for 90 minutes, and when the polymerization reaction is over the resulting polymer resin solution is cooled down and is diluted with 150 g of butyl acetate to a solids content of 40%.

4. Base lacquer from 1

The polyester solution prepared in 1. is mixed with a solution of a butyric acid/acetic acid ester of cellulose containing 37% of butyrate and 13% of acetate, of 20% strength in 1:1 xylene/n-butyl acetate, a partially n-butanol-etherified condensation product of melamine and formaldehyde, 55% strength in butanol, and a finely divided 65% strength aluminum bronze wetted in aliphatic hydrocarbons in such a way that said components are present in a ratio of 35:25:25:15, based on the solids content, and the overall solids content is 22%. The lacquer is completed by adding 8% of n-butyl glycolate, 2% of diethylene glycol n-butyl ether and sufficient of a mixture of xylene and n-butyl acetate as to produce 100 parts by weight.

5. Base lacquer from 2

The acrylate resin solution prepared in 2. is mixed with the cellulose acetobutyrate mentioned under 4. and a highly viscous n-butanol-etherified urea/formaldehyde condensation resin and Al bronze in a ratio of 38:30:20:12, based on the solids content, to give an overall solids content of 20%. Then 4. is followed.

6. Base lacquer from 3

25% by weight of the acrylate resin solution prepared in 3. is mixed with 45.0% of a medium-viscous cellulose acetobutyrate dissolved to 20% strength in butyl acetate and xylene (70:30), 3.2% of a 65% strength medium-fine Al bronze, 5.0% of ethylene glycol monoethyl ether acetate, 2.5% of 2-ethylhexanol, 1.0% of a 1% strength solution of a phenylmethylpolysiloxane and 18.3% of butyl acetate, so that the resulting homogeneous base lacquer has a solids content of 21.4%.

EXAMPLE II. 1–4

(Composition see Table 1)

The solvent (mixture) specified in the table is weighed into a reaction vessel equipped with stirrer, thermometer, reflux condenser and two add vessels, and is heated to the indicated polymerization temperature. The indicated monomer mixture and the indicated initiator solution are then metered at a uniform rate into the reaction vessel, respectively from the first add vessel in the course of 4 hours and the second add vessel in the course of 4.5 hours. The indicated temperature is maintained by heating and cooling, for an additional 1.5 hours after the final add. The result is polymer resin solutions having the parameters indicated in the table.

TABLE 1

| | Acrylate resins A | | | |
|---|---|---|---|---|
| | II. 1 | II. 2 | II. 3 | II. 4 |
| Solvent: | | | | |
| Solvent benzene[1] | 600 | 600 | 520 | 520 |
| Ethylene glycol ethyl ether acetate | — | — | 80 | 80 |
| Monomers: | | | | |
| Ethylhexyl acrylate | — | 250 | — | 208 |
| n-Butyl acrylate | 300 | — | 285 | — |
| t-Butyl acrylate | — | 363 | 350 | 260 |
| Ethyl acrylate | 320 | — | — | — |
| 2-Hydroxypropyl acrylate | 320 | 295 | 350 | 355 |
| 2-Hydroxyethyl acrylate | — | — | — | — |
| Acrylic acid | 10 | 12 | 15 | 127 |
| n-Butyl methacrylate | — | — | — | 150 |
| Styrene | 50 | 80 | — | — |
| Initiator solution: | | | | |
| Solvent benzene[1] | 65 | 65 | 65 | 65 |
| Di-tert.-butyl peroxide | 48 | 56 | 40 | 60 |
| Polymerization temperature: °C. | 150 | 150 | 145 | 145 |
| Parameters: | | | | |
| Solids content % | 60 | 60 | 60 | 60 |
| η (DIN 53,015)[2] mPas | 220 | 295 | 280 | 215 |
| OH number | 142 | 127 | 150 | 153 |
| Acid number | 12.0 | 15.5 | 17.8 | 26.0 |
| $T_g$ | −24.9 | −11.5 | −10.4 | −14.1 |

[1]Solvent benzene = alklbenzene-containing aromatics fraction from 156–172° C.
[2]η = viscosity

EXAMPLE III

Acrylate resins

EXAMPLE III. 1–4

Examples II. 1–4 are repeated using the raw materials and quantities of Table 2.

The compositions in the tables are given in parts by weight.

TABLE 2

| | Acrylate resins B | | | |
|---|---|---|---|---|
| | III.1 | III. 2 | III. 3 | III. 4 |
| Solvent: | | | | |
| Solvent benzene | — | 450 | 450 | 450 |
| Xylene | 250 | — | — | — |
| Ethylglycol acetate | 150 | — | — | — |
| Butyl acetate | 200 | 150 | 150 | 150 |
| Monomers: | | | | |
| Ethylhexyl methacrylate | 150 | — | 100 | — |
| n-Butyl methacrylate | — | 180 | 190 | 300 |
| Methyl methacrylate | 345 | 450 | 380 | 250 |
| Hydroxyethyl methacrylate | 100 | 210 | — | — |
| Hydroxypropyl methacrylate | 150 | — | 210 | 270 |
| Methacrylic acid | 5 | 10 | 20 | 30 |
| n-Butyl acrylate | 100 | — | — | 150 |
| Ethylhexyl acrylate | — | 150 | — | — |
| Styrene | 150 | — | — | — |
| Initiator solution: | | | | |

TABLE 2-continued

| Acrylate resins B | III.1 | III. 2 | III. 3 | III. 4 |
|---|---|---|---|---|
| Di-tert.-butyl peroxide | 45 | 30 | 40 | 50 |
| Xylene | 65 | 65 | 65 | 65 |
| Polymerization temperature: °C. | 125 | 130 | 130 | 130 |
| Parameters: | | | | |
| Solids content % | 60 | 60 | 60 | 60 |
| η (50% with EGA)* mPa.s | 650 | 550 | 750 | 450 |
| OH number | 102 | 91 | 82 | 86 |
| Acid number | 4.0 | 8.5 | 16.5 | 24.5 |
| $T_g$ | 50.4 | 36.3 | 55.6 | 40.0 |

*EGA = ethylglycol acetate

TABLE 3

| Acrylate resin mixtures A + B (Mixture IV) | | | | | |
|---|---|---|---|---|---|
| IV: | 1 | 2 | 3 | 4 | 5 |
| Acrylate resin solution II. 1 | 60.0 | 48.0 | — | — | — |
| Acrylate resin solution II. 2 | — | — | 60.0 | — | — |
| Acrylate resin solution II. 3 | — | — | — | 73.0 | — |
| Acrylate resin solution II. 4 | — | — | — | — | 65.0 |
| Acrylate resin solution III. 1 | 23.0 | — | 23.0 | — | — |
| Acrylate resin solution III. 2 | — | 35.0 | — | — | — |
| Acrylate resin solution III. 3 | — | — | — | 10.0 | — |
| Acrylate resin solution III. 4 | — | — | — | — | 18.0 |
| Ethylene glycol monoethyl ether acetate | 8.0 | 8.0 | 8.0 | 8.0 | 8.0 |
| Ethylene glycol monobutyl ether acetate | 2.0 | 2.0 | 2.0 | 2.0 | 2.0 |
| Derivative of oxanilide | 0.5 | 0.5 | 0.5 | — | 0.5 |
| Phenylmethylpolysiloxane (5% strength in xylene) | 0.8 | 0.8 | 0.8 | 0.8 | 0.8 |
| Xylene | 5.7 | 5.7 | 5.7 | 5.7 | 5.7 |
| Solids content % | 50 | 50 | 50 | 50 | 50 |

Application

Base lacquers are adjusted with xylene/butyl acetate to a viscosity of 17 seconds in the German Industrial Standard DIN cup 4 and are applied with a flow cup gun in a dry film thickness of 18 μm. After a period of three minutes during which the applied base lacquer coat is allowed to air, clear lacquers IV. 1 to IV. 5 are applied by spraying with a flow cup gun; dry film thicknesses of 35 μm are obtained for the clear lacquer.

When base lacquers I. 4 and I. 5 are used baking temperatures of 90° C. (45 minutes) and 130° C. (30 minutes) are used for the entire system. In the case of base lacquer I. 6 and the clear lacquer, an additional 2% of a 1% strength solution of dibutyltin dilaurate in n-butyl acetate is added, and drying takes place at 60° C. in the course of 60 minutes.

The two-layer metallic systems display a very good metallic effect and have high surface brightness and good resistance to 10% strength hydrochloric acid and 10% strength sulfuric acid and xylene.

Lacquer IV. 4 has a crack time of 2,100 hours in the Xenon Weather-O-meter with quartz filters from 280 nm and a dry/wet cycle of 17/3. Lacquers IV. 1, 2, 3 and 5 are still free of cracks at this time.

What is claimed is:

1. A binder for coating compositions applied as transparent topcoats of multilayer coatings in the wet-on-wet method, consisting essentially of:
   (A) 50 to 90% by weight, based on total acrylic polymers, of a first acrylic polymer having a molecular weight of 800 to 4,000; a hydroxyl number of 80 to 180; and a glass transition temperature below −10° C.;
   (B) 10 to 50% by weight, based on total acrylic polymers, of a second acrylic polymer having a molecular weight of 3,000 to 10,000; a hydroxyl number of 40 to 120; and a glass transition temperature of −10° C. to +70° C.; and
   (C) polyisocyanates selected from the group consisting of aliphatic polyisocyanates, cycloaliphatic polyisocyanates, and mixtures thereof in a sufficient amount that there are 0.8 to 1.3 isocyanate groups per hydroxyl group of components (A) and (B).

2. The binder of claim 1, wherein component A is prepared from:
   ($a_1$) 75 to 100% by weight of acrylic acid esters;
   ($a_2$) 0 to 25% by weight of methacrylic acid esters, a sufficient proportion of components $a_1$ and $a_2$ being hydroxyalkyl acrylates or hydroxyalkyl methacrylates that the hydroxyl number of 80 to 180 is reached;
   ($a_3$) 0 to 15% by weight of comonomers having aromatic groups; and
   ($a_4$) 0 to 2% by weight of α,β-ethylenically unsaturated acids, the proportions of components $a_1$ to $a_4$ adding up to 100%.

3. The binder of claim 2, wherein component B is prepared from:
   ($b_1$) 0 to 30% by weight of acrylic acid esters;
   ($b_2$) 70 to 90% by weight of methacrylic acid esters, a sufficient proportion of components $b_1$ and $b_2$ being hydroxyalkyl acrylates or hydroxyalkyl methacrylates that the hydroxyl number of 40 to 120 is reached;
   ($b_3$) 0 to 30% by weight of comonomers having aromatic groups; and
   ($b_4$) 0 to 3% by weight of α,β-ethylenically unsaturated acids, the proportions of components $b_1$ to $b_4$ adding up to 100%.

4. In a process for applying a multilayer coating comprising applying at least one pigment containing base coat to a substrate, air drying the base coat, applying at least one transparent top coating to said base coating by the wet-on-wet method and hardening said coatings, the improvement comprising said transparent top coating applied from a coating composition having a binder consisting essentially of:
   (A) 50 to 90% by weight, based on total acrylic polymers, of a first acrylic polymer having a molecular weight of 800 to 4,000; a hydroxyl number of 80 to 180; and a glass transition temperature below −10° C.;
   (B) 10 to 50% by weight, based on total acrylic polymers, of a second acrylic polymer having a molecular weight of 3,000 to 10,000; a hydroxyl number of 40 to 120; and a glass transition temperature of −10° C. to +70° C.; and (C) polyisocyantes selected from the group consisting of aliphatic polyisocyanates, cycloaliphatic polyisocyantes, and mixtures thereof in a sufficient amount that there are 0.8 to 1.3 isocyanate groups per hydroxyl group of components (A) and (B).

5. The process of claim 4, wherein component A is prepared from:
   ($a_1$) 75 to 100% by weight of acrylic acid esters;
   ($a_2$) 0 to 25% by weight of methacrylic acid esters, a sufficient proportion of components $a_1$ and $a_2$ being hydroxyalkyl acrylates or hydroxyalkyl methacrylates that the hydroxyl number of 80 to 180 is reached;
   ($a_3$) 0 to 15% by weight of comonomers having aromatic groups; and
   ($a_4$) 0 to 2% by weight of $\alpha,\beta$-ethylenically unsaturated acids, the proportions of components $a_1$ to $a_4$ adding up to 100%.

6. The process of claim 5, wherein Component B is prepared from:
   ($b_1$) 0 to 30% by weight of acrylic acid esters;
   ($b_2$) 70 to 90% by weight of methacrylic acid esters, a sufficient proportion of components $b_1$ and $b_2$ being hydroxylalkyl acrylates or hydroxyalkyl methacrylates that the hydroxyl number of 40 to 120 is reached;
   ($b_3$) 0 to 30% by weight of comonomers having aromatic groups; and
   ($b_4$) 0 to 3% by weight of $\alpha,\beta$-ethylenically unsaturated acids, the proportions of components $b_1$ to $b_4$ adding up to 100%.

7. In a multilayer coated article having a substrate, at least one pigment containing base coat applied to said substrate and at least one transparent top coating applied to said base coating by the wet-on-wet method, the improvement comprising said transparent top coating applied from a coating composition having a binder consisting essentially of:
   (A) 50 to 90% by weight, based on total acrylic polymers, of a first acrylic polymer having a molecular weight of 800 to 4,000; a hydroxyl number of 80 to 180; and a glass transition temperature below −10° C.;
   (B) 10 to 50% by weight, based on total acrylic polymers, of a second acrylic polymer having a molecular weight of 3,000 to 10,000; a hydroxyl number of 40 to 120; and a glass transition temperature of −10° C. to +70° C.; and
   (C) polyisocyanates selected from the group consisting of aliphatic polyisocyanates, cycloaliphatic polyisocyanates, and mixtures thereof in a sufficient amount that there are 0.8 to 1.3 isocyanate groups per hydroxyl group of components (A) and (B).

8. The coated article of claim 7, wherein component A is prepared from:
   ($a_1$) 75 to 100% by weight of acrylic acid esters;
   ($a_2$) 0 to 25% by weight of methacrylic acid esters, a sufficient proportion of components $a_1$ and $a_2$ being hydroxyalkyl acrylates or hydroxyalkyl methacrylates that the hydroxyl number of 80 to 180 is reached;
   ($a_3$) 0 to 15% by weight of comonomers having aromatic groups; and
   ($a_4$) 0 to 2% by weight of $\alpha,\beta$-ethylenically unsaturated acids, the proportions of components $a_1$ to $a_4$ adding up to 100%.

9. The coated article of claim 8, wherein component B is prepared from:
   ($b_1$) 0 to 30% by weight of acrylic acid esters;
   ($b_2$) 70 to 90% by weight of methacrylic acid esters, a sufficient proportion of components $b_1$ and $b_2$ being hydroxyalkyl acrylates or hydroxyalkyl methacrylates that the hydroxyl number of 40 to 120 is reached;
   ($b_3$) 0 to 30% by weight of comonomers having aromatic groups; and
   ($b_4$) 0 to 3% by weight of $\alpha,\beta$-ethylenically unsaturated acids, the proportions of components $b_1$ to $b_2$ adding up to 100%.

10. The binder of claim 3, wherein:
    ($a_1$) is 75 to 96%;
    ($a_2$) is 2 to 25%;
    ($a_3$) is 2 to 15%;
    ($a_4$) is 0.2 to 2%;
    ($b_1$) is 2 to 30%;
    ($b_2$) is 60 to 96%;
    ($b_3$) is 2 to 30%; and
    ($b_4$) is 0.2 to 2%.

11. The process of claim 6, wherein:
    ($a_1$) is 75 to 96%;
    ($a_2$) is 2 to 25%;
    ($a_3$) is 2 to 15%;
    ($a_4$) is 0.2 to 2%;
    ($b_1$) is 2 to 30%;
    ($b_2$) is 60 to 96%;
    ($b_3$) is 2 to 30%; and
    ($b_4$) is 0.2 to 2%.

12. The coated article of claim 9, wherein:
    ($a_1$) is 75 to 96%;
    ($a_2$) is 2 to 25%;
    ($a_3$) is 2 to 15%;
    ($a_4$) is 0.2 to 2%;
    ($b_1$) is 2 to 30%;
    ($b_2$) is 60 to 96%;
    ($b_3$) is 2 to 30%; and
    ($b_4$) is 0.2 to 2%.

* * * * *